United States Patent [19]

Gabriel et al.

[11] Patent Number: 4,840,490
[45] Date of Patent: Jun. 20, 1989

[54] LASER POSITION MEASUREMENT AND ALIGNMENT

[75] Inventors: David Gabriel, Kingston; David Audus, Marlow; Norman Strange, Chichester, all of England

[73] Assignee: Lasercheck Limited, Burnham, United Kingdom

[21] Appl. No.: 902,370
[22] PCT Filed: Dec. 10, 1985
[86] PCT No.: PCT/GB85/00565
  § 371 Date: Sep. 30, 1986
  § 102(e) Date: Sep. 30, 1986
[87] PCT Pub. No.: WO86/03581
  PCT Pub. Date: Jun. 19, 1986

[30] Foreign Application Priority Data

Dec. 10, 1984 [GB] United Kingdom ............... 8431148
Apr. 22, 1985 [GB] United Kingdom ............... 8510218

[51] Int. Cl.$^4$ .................................................. G01B 11/26
[52] U.S. Cl. .................................. 356/375; 356/154; 356/138
[58] Field of Search ............... 356/375, 147, 154, 138, 356/152

[56] References Cited

U.S. PATENT DOCUMENTS

| | | | |
|---|---|---|---|
| 3,085,158 | 4/1963 | Miller | 250/203 |
| 3,118,069 | 1/1964 | Guillant | 356/375 |
| 3,388,629 | 6/1968 | Brenholdt et al. | 88/1 |
| 3,435,232 | 3/1969 | Sorensen | 356/375 X |
| 3,469,102 | 9/1969 | Huvers | 356/152 |
| 3,481,672 | 12/1964 | Zoot | 356/375 |
| 3,778,169 | 12/1973 | Adams | 356/172 |
| 3,900,738 | 8/1975 | McKay, Sr. | 356/375 X |
| 3,957,377 | 5/1976 | Hutchinson | 356/152 |
| 3,981,588 | 9/1976 | Wirttnen | 356/152 |
| 4,074,131 | 2/1978 | Schwebel | 356/375 X |
| 4,117,327 | 9/1978 | Lamelot et al. | 250/338 |
| 4,178,505 | 12/1979 | Skagerlund | 356/152 |
| 4,307,338 | 12/1981 | Frederiksen et al. | 356/152 |
| 4,627,724 | 12/1986 | Cameron | 356/152 |
| 4,692,613 | 9/1987 | Masudae et al. | 356/152 |

FOREIGN PATENT DOCUMENTS

| | | |
|---|---|---|
| 0088608 | 5/1983 | Japan . |
| 1596544 | 8/1981 | United Kingdom . |
| 2074808 | 11/1981 | United Kingdom . |

Primary Examiner—Thomas H. Tarcza
Assistant Examiner—Mark Hellner
Attorney, Agent, or Firm—Sughrue, Mion, Zinn, Macpeak and Seas

[57] ABSTRACT

A laser beam (22) is used as a spacial reference and its position is measured relative to a target device (200A, 200B, 200C) mounted on a structure (210) being monitored (FIG. 6). The target device has two edges or slots which are moved to intersect the beam such that the two intersections occur at right angles to one another at the beam for maximum accuracy. The edges may be fixed and are in such relation that one coordinate of beam position is a monotonic function of the displacement of the beam between positions at which one and the other edge intersect the beam. The other coordinate is obtained by the relative displacements for intersection of the beam from a reference position. In one embodiment (FIG. 2) the target (30) is moved linearly and the edges (40,42) are straight and mutually orthogonal. In another embodiment (FIG. 3) the target (100) is mounted for rotational displacement with arcuate intersecting edges (104, 106). It is shown how the ideal case for right-angle intersections can be reasonably approached by use of arcs of circles. In a modification of the rotational device, the two edges (324, 326) are made separately movable about a common axis (314) whereby they can be maintained adjacent the beam (222) to track beam movement (FIG. 9). Detection of intersection can be made remotely by a separate receiver (230) (FIG. 6) or by using light guides (304,306)(FIG. 8) on the target edges, or reflective target edges (105,107,311)(FIG. 12,13) to separate detectors.

33 Claims, 8 Drawing Sheets

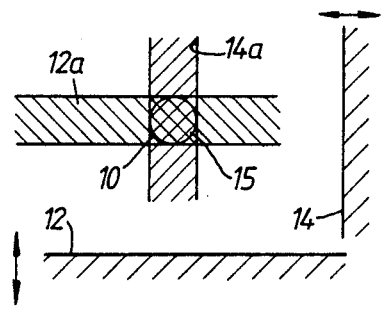
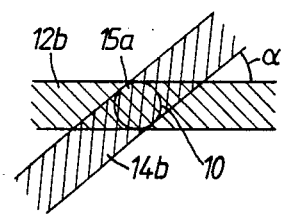
FIG. 1.  FIG. 1A.
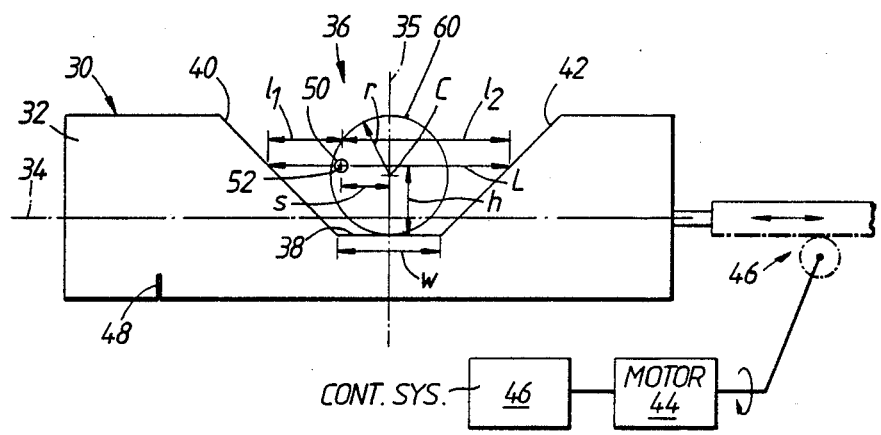
FIG. 2.
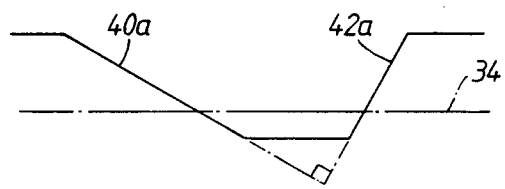
FIG. 2A.

LASER POSITION MEASUREMENT AND ALIGNMENT

FIELD OF THE INVENTION

This invention relates to a method and apparatus for measuring the position in a plane of an intersectable beam passing through the plane or the position of a tangible object located in a plane. The invention finds particular application to measuring the position of a laser beam relative to a structure to be monitored and will be described in relation to the detection of the position of a beam.

BACKGROUND TO THE INVENTION

It has been proposed to use a laser beam as a spacial reference against which the movement of a portion of a natural or man-made structure can be measured. The laser can be mounted at a reference point to be directed adjacent a structure to be monitored. The portion of the structure monitored carries a target which intercepts the beam to measure the position of the beam relative to the target. In one prior proposal the target normally allows the beam to pass whereby a number of such targets can be mounted at different points of the structure spaced along the beam. One such target employs two orthogonal straight edges individually movable to intercept the beam so that by measuring the positions of the straight edges at the points of interception the beam position is measured in Cartesian coordinates. For a further discussion of this kind of detection system reference may be had to published International Application No. WO85/00222 which was published on Jan. 17th, 1985, that is after the priority date of the present application, and which corresponds to commonly assigned U.S. application Ser. No. 705,469 filed Feb. 21, 1985.

Various other techniques for using laser beams in position measurement have been disclosed in British patent specification Nos. GB 1550934, GB 1511265, GB 1483021, GB 2074808 and GB 2090096A. The present invention is concerned with the detection of a beam by intersection of two target edges with the beam but adopts a different approach to that set out in the above-mentioned application WO85/00222.

SUMMARY OF THE INVENTION

According to one aspect of the invention there is provided a method of detecting the position of a laser beam or other object in which two curves are moved along respective predetermined paths for the beam to impinge thereon, the curves having a shape such that the sum of their displacements from reference positions to be impinged on by the beam is a monotonic function of the distance of the beam or other object from an axis from which such distance is determined as one coordinate of beam position and that at least one displacement from a reference position is used to determine a position for the beam or other object as a second coordinate of beam or other object position.

The two curves may be in fixed spaced apart relation having a common reference position. For example they may be formed as spaced edges of a target structure that is either linearly movable in the direction of an axis or rotationally movable about an axis. The linear or angular spacing, as the case may be, is a monotonic function of distance from the axis in question. A theoretical derivation of suitable curves, which in the linear case may be straight lines, is given hereinafter for both cases. Ideally to minimise error in position of a laser beam or other object is 90°. The angle is defined as the angle between the respective tangents to the curves at the point they intersect. In the case of the rotary target structure it will be shown how a curve based on a simple arc can be oriented to achieve a sufficiently close approximation while achieving the 90° intersection angle at at least one radial value.

In the case of fixed curves, the edges preferably define therebetween a detection notch as it is called hereinafter within which the beam or other object lies. Preferably the target structure is symmetrical and the common reference axis is the axis of symmetry. The sum displacement, linear or angular, is the spacing between the two edges at the points at which they intersect a given beam or other object position. If this position is offset from the axis of symmetry, then the other coordinate is obtained from the offset which requires a difference in displacement of the two curves from the position to intercept the beam or other object.

The fixed target structure in which the curves are moved as a unit requires an interval from movement through a given position by one edge then the other. An alternative is to have the curves separately movable so that each can be maintained in a continuous impingement state. To this end the curves may be realised as slots or edges which intersect to define a transmission aperture that is maintained aligned with a laser or other beam. Although this requires additional means for mechanical movement, the ability to keep track of a beam position is an advantage in some circumstances. The position determination is essentially the same as the fixed case but the two curve positions are measured virtually simultaneously from respective reference positions.

In the case of a laser beam being used as a spacial reference for a target device mounted to a monitored structure, normally the device should allow for a given amount of displacement in any direction from an initial position. Thus there is a circular area, called the target circle area hereinafter, in which the beam may lie relative to the target. It will be shown how this can be accommodated within the various devices to be described.

In another aspect the invention provides a target device for detecting the position of a laser beam or other object, comprising a structure movable in the direction of an axis and having first and second edges lying in a plane and extending in spaced apart relationship transversely of said axis to intercept a laser beam or other object in said plane, said edges having a predetermined disposition with respect to said axis and being shaped such that as a function of position normal to said axis the spacing between said edges taken along an axis parallel said axis of motion is a monotonic function of position.

In one embodiment of this target device, the first and second edges are straight, and more particularly they are mutually orthogonal. Preferably each edge is at 45° to the abovementioned axis. In the target of this kind to be described the structure comprises an opaque body having a light-transmissive opening therein bounded by said two edges.

Yet another aspect of this invention is a position detection apparatus including a target device of the invention and including means mechanically coupled to the target structure to move same to-and-fro in the direction of the aforesaid axis, means for detecting the interception of a beam or other object by each edge, means for recording the position of said structure at the interception of said beam or other object by each edge to determine the spacing between the points of interception, and means for comparing the position of said target at least one point of interception with a reference target structure position to determine the position of said beam or other object in the direction of the axis.

In this position detection apparatus, the means for moving the target structure preferably comprises a step motor as a motive source and the target structure position is measured in terms of the step position of the step motor.

In a position detection system including the position detection apparatus of the invention, the target device may be mounted to a structure to be monitored to move therewith, and a laser beam transmitter mounted to direct a laser beam through the said plane of the target device. In this system the meand for detection of the interception of the beam may comprise a receiver for the laser beam mounted remote from said target device. Alternatively the means for detection of the interception of the beam may include respective means mounted at each edge to respond to the impingement of the beam thereon.

In yet another aspect the invention provides a target device for detecting the position of a laser beam or other object, comprising a structure having first and second numbers movable in the direction of an axis, said first and second members having first and second slots respectively lying substantially in a plane containing said axis and extending transversely of said axis between defined limits, the mutual orientation of said slots being such that the first and second members are movable in the direction of said axis from respective reference positions such that the slots intersect to provide an aperture for beam transmission at a distance normal to the axis that is a monotonic function of the sum of the displacements of the first and second numbers from their respective reference positions. It is presently preferred that each slot be replaced by an edge defining a bound between areas respectively preventing and allowing beam transmission or object positioning. In a preferred construction each of the first and second slots or edges is straight, and preferably the slots or edges are mutually orthogonal, and more particularly each slot or edge is at 45° to the aforesaid axis.

The invention further provides position detecting apparatus including a target device as set out in the preceding paragraph and including means mechanically coupled to the first and second members to move same to-and-fro in the direction of said axis, means for detecting the interception of the beam by each slot or edge, means for recording the respective positions of the members to determine the sum displacement, and means for comparing the position of at least one of the members with its reference position to determine the position of the beam in the direction of said axis. Preferably the moving means comprises a respective drive for each member using a step motor as a motive source and the position of each member is measured in terms of the step position of the step motor.

A particular application is to a position detection system which includes the position detecting apparatus just mentioned, the target device being mounted to a structure to be monitored to move therewith, and a laser beam transmitter mounted to direct a laser beam at the target device.

A still further aspect of the invention provides a target device for detecting the position of a laser beam or other object comprising a structure rotatable about an axis and having first and second edges lying in a plane normal to said axis and extending in angularly spaced apart relationship with respect to said axis to intercept a laser beam or other object lying in said plane, said edges having a predetermined disposition with respect to said axis and being shaped such that as a function of radial distance from said axis the angular spacing between said edges at such radial distance is a monotonic function of the radial distance.

In one construction to be described the first and second edges are arcs of circles extending radially between an outer and an inner radial limit, each arc being concave as seen from the other. More particularly in the described construction the tangent to each arc at a point on the arc lying at a radial distance midway between said limits is substantially at 45° to the radial line extending through that point. Preferably each arc is oriented to have the tangent thereto at each of said limits at about the same angle to the respective radial line through the tangent point at each limit. In general in implementing this aspect of the invention the arcs are preferably symmetrical about a radial axis.

Considered in another way, in a target device having a rotatable structure in accord with the invention, the first and second edges are curves extending between an outer and an inner radial limit, each curve being concave as seen from the other, and each curve being such that the tangent thereto at a radial distance midway between said limits is substantially at 45° to the radial line extending through the tangent point and that the tangent to each curve at one of said limits is substantially at 45° to the radial line extending through the tangent point at said one limit. Preferably the curves are symmetrical about a radial axis. More particularly it is preferred that the edges define therebetween a space sufficient to contain a circle of a diameter equal to the radial distance between said inner and radial outer limits, and centered at a radial distance midway between said limits.

A target device having a rotatable structure of the kind that has been discussed, may have the structure comprise a disc having a light-transmissive opening therein bounded by the aforesaid two edges.

It is also an aspect of this invention to provide a position detection apparatus including a target device having a rotatable structure and including means mechanically coupled to the target structure to move same angularly to-and-fro about said axis of rotation, means for detecting the interception of a beam or other object by each edge, means for recording the position of said structure at the interception of the beam or other object by each edge to determine the angular spacing between the points of interception, and means for comparing the position of said target at least one beam with a reference target structure position to determine the angular position of said beam or other object with respect to said reference position.

The means for moving the target structure may comprise a step motor as a motive source and the target structure position is measured in terms of the step position of said step motor.

This position detecting apparatus may be included within a position detection system, the target device being mounted to a structure to be monitored to move therewith, and there being a laser beam transmitter mounted to direct a laser beam through the plane of said target device. In such a system the means for detection of the interception of the beam may comprise a receiver for the laser beam mounted remote from said target device, or may include respective means mounted at each edge to respond to the impingement of the beam thereon.

A further aspect of the invention provides a target device for detecting the position of a laser beam or other object, comprising a structure having first and second members rotatable about a common axis and having first and second slots respectively lying substantially in a plane normal to said axis and extending generally radially of said axis, the mutual orientation of said slots being such that the first and second members are movable about said axis from respective reference positions such that the slots intersect to provide an aperture for beam transmission at a radial distance from said axis that is a monotonic function of the sum of the angular displacements of the first and second members from their respective reference positions. It is presently contemplated that each slot is replaced by an edge defining a boundary between areas respectively preventing and allowing beam transmission or object positioning.

In a structure to be described that is in accord with this last-mentioned aspect of the invention the first and second slots or edges are arcs of circles extending radially between an outer and an inner radial limit, each arc being concave as seen from the other. More particularly it is preferred that the tangent to each arc at a point on the arc lying at a radial distance midway between said limits is substantially at 45° to the radial line extending through that point. Still more preferred is that each arc is oriented to have the tangent thereto at each of said limits at about the same angle to the respective radial line through the tangent point at each limit. In the structure to be described the arcs are symmetrical with respect to a radial axis.

The shape of the curves of the first and second slots or edges may also be defined in the manner set out with respect to the earlier discussed rotatable structure.

Where slots are employed the first and second members may be slotted discs.

The invention also provides position detecting apparatus including a target device as set forth in the last-mentioned aspect of the invention, and including means mechanically coupled to the first and second means to move same to-and-fro about said axis, means for recording the respective positions of said members to determine the sum angular displacement, and means for comparing the position of at least one of the members with its reference position to determine the position of the beam in the direction of the axis. The moving means may comprise a respective drive for each member using a step motor as a motive source and the position of each member is measured in terms of the position of the step motor. This position detecting apparatus may also be included in a position detecting system, said target device being mounted to a structure to be monitored to move therewith, and a laser beam transmitter being mounted to direct a laser beam at said target device.

The discussion of the aspects of the invention thus far has referred to specific embodiments in which a remote receiver is used as a detector of the intersection of the beam. It will be appreciated that a series of target devices can be arranged along the beam in many cases to provide monitoring at different points. For some purposes it may be desirable to have the detection of beam impingement on the target device essentially done at the target itself. Modifications to the target structures to enable this to be done will be described. However, this local detection problem may be approached in another way.

Another aspect of this invention provides a target structure for detecting the position of a laser beam having at least one edge for impingement thereon of a laser beam, the or each edge of the target structure comprising a reflective surface at an angle to a plane of movement of the structure so as to reflect a laser beam impinging thereon transversely of the structure to a detector mounted on the structure.

Preferably the or each edge is an arc of a circle and detector means is located at the centre of the or each circle. The or each reflective surface may be at 45° to the plane of movement. In general target structures of this kind may have the constructional features of the target structures already discussed.

In order that the invention and its practice may be better understood embodiments of it and the methods of performing it will now be described in greater detail with reference to the accompanying drawings.

BRIEF DESCRIPTION OF THE DRAWINGS

FIG. 1 is a diagrammatic showing of how two straight edges that orthogonally intercept a laser beam provide a detection of beam position with least uncertainty;

FIG. 1A is a diagrammatic showing of the greater uncertainty when the edges intercept the beam non-orthogonally;

FIG. 2 is a diagrammatic illustration of a linearly-movable target device and drive system therefor in accord with the present invention;

FIG. 2A shows a modification of the detection notch shape of the target of FIG. 2;

Referring to FIG. 1, there is shown a laser beam 10 assumed to be directed through the plane of the paper from a laser to a detector (neither shown). Although small, the beam has a real cross-section. The position of the beam is measured by members providing two orthogonal straight edges 12 and 14. Each is separately moved to intercept the beam. The decision has to be made as the edge passes through the beam, as to the degree of diminishment of detected intensity that is taken to be the point of interception defining the beam position. There is inevitably some degree of uncertainty in the detection process. The uncertainty for edge 12 is denoted by area 12a; that for edge 14 by 14a. The areas are exaggerated for clarity. Thus the beam as measured could lie anywhere in the overlap of the areas 12a and 14a. The overlap area 15 is cross-hatched and rectangular—in practice a square. This is a special case of the more general situation shown in FIG. 1a where the uncertainty areas are 12b and 14b and where it is assumed that the line of one edge where it intersects the beam is at other than a right angle to the line of the other edge at intersection. The area of uncertainty within which the beam could lie is now the crosshatched parallelogram 15a, the widths of the areas (i.e. normal to the edges) remaining as before. It can be readily shown that the area is at a minimum when the edges respectively intersect the beam at right angles. The acute angle α between the edges at the intersection of the beam will be referred to herein as "the angle of intersection". It relates only to the relative positions of the edges at the intersection with the beam. It is not affected by the direction of motion of the edges. Thus in FIG. 1 it is not necessary to have each edge moved in a direction normal to the edge.

Figure 3:
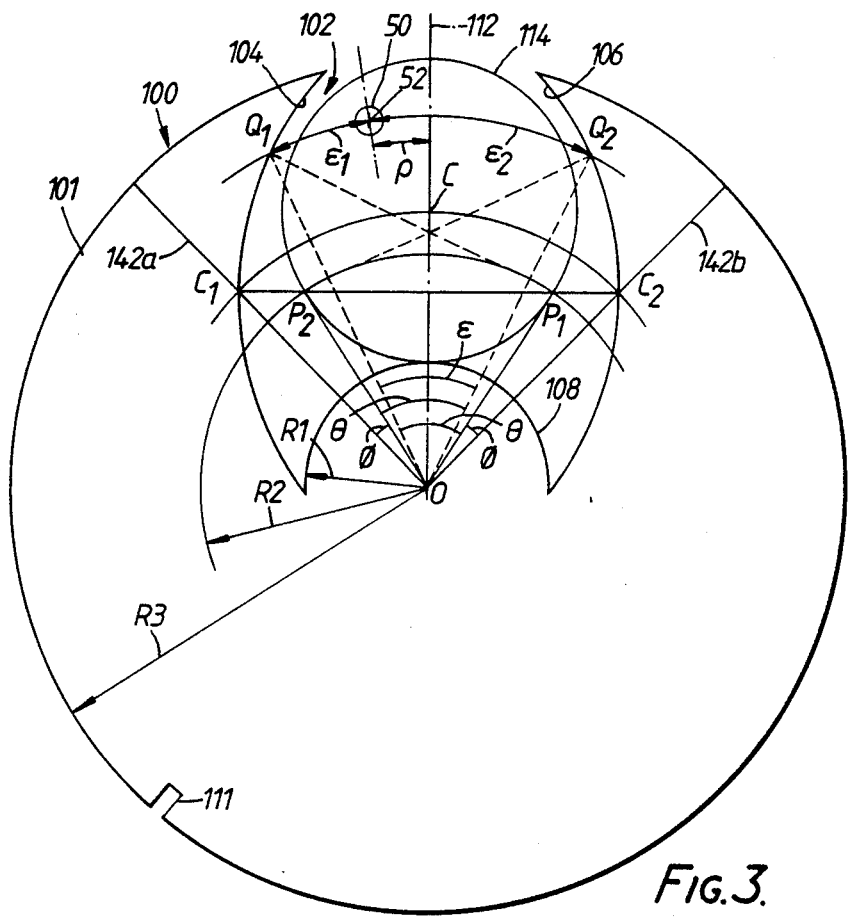
FIG. 3 shows a preferred target device for rotational movement, the figure containing geometrical constructions relevant to an understanding of the operation of the device.

As will become clear from the later description the edges may not be straight in which case the angle of intersection refers to the angle between the positions of the respective tangents to the edges at the point of interception of the beam.

FIG. 2 shows in diagrammatic form a practical device in accord with the invention for measuring the position of the beam using a single direction of linear motion. A target 30 comprises a generally rectangular plate 32 of opaque material reciprocally displaceable along an axis 34 which is exemplified as being horizontal. The plate is formed with a V-shaped detector notch 36 symmetrical about an axis 35 normal to the axis 34, i.e. a vertical axis in the example. The notch is truncated at 38—the truncation is parallel to the axis—and has side edges 40 and 42 which lie at right angles to one another and at 45° to the axis of symmetry 35.

The plate 32 is movable to-and-fro along axis 34 by a motor 44. The motor may be a rotary stepper motor coupled to the plate through a rack-and-pinion drive 46, for example to obtain the desired linear motion. The plate is also provided with an index notch or other mark 48 to index a reference horizontal position. A laser beam 50 directed normally to the plane of the plate is positioned within notch 36. The beam axis is indicated as 52. If the plate is moved horizontally from a position at which one edge 40 of the notch intercepts the beam axis to a position at which the other edge 42 intercepts the beam axis (the manner in which such interception is detected is described below) it is seen that the horizontal travel L of the plate between the two positions is a linear function of the vertical height h of the beam axis. If h is referenced to the truncated portion 38 of the notch, and the latter has a width W, then:

$$h = (L - W)/2 \quad (1)$$

The above result is true whatever the horizontal position of the beam at the height h. As shown the beam is offset by a distance s from the axis of symmetry 34 of the notch. The plate is assumed to be stationary in a reference position. The beam axis 52 is at distances $l_1$ and $l_2$ from edges 40 and 42 respectively. Thus the offset and its direction is given by:

$$s = l_1 - l_2 \quad (2)$$

Because $L = l_1 + l_2$, it is in fact only necessary to measure two of the parameters L, $l_1$, $l_2$ to obtain both h and s. It is also necessary to determine the reference position of the plate 32. If variations of the beam position relative to target are of importance rather than an absolute measure of position, then it is sufficient that the reference position is consistently reproducible. This may be done with the aid of the index 48 aligned with some external optical device or by any other suitable means.

A stepper motor is particularly useful as the source of motion since its step position, which can be determined by counting up or down as energisation of the motor is commanded, is directly proportional to the linear position of the plate 32. Thus once the initial reference position is established the pertaining step position of the motor—that is the count value at that position—serves as "zero" reference. The beam interceptions of edges 40 and 42 will yield count values whose respective differences with the reference count represent $l_1$ and $l_2$ respectively. It will also be seen that a measurement of the beam position can be made by a single traverse of the plate from the beam emerging at one edge to being obscured at the other. The stepper motor 44 is conveniently controlled as part of a control system 46, for example, a microprocessor-controlled system with the necessary step counters. The stepper motor and thus the plate is commanded to a position. The plate position itself is not measured, other than in setting up the reference position, and thus it is necessary that the commanded position be accurately translated into the linear position of the plate. More is said on this below.

In practice the laser beam is not an infinitesimal axis 52 but has some width dimension as shown by 50. The detector circuitry decides that the beam is crossing the axis when the detected beam intensity falls to a proportion, say 50%, of its unobscured value. The detection is subject to error. However, as shown in connection with FIG. 1, the potential error is minimized by having the two detection edges 40 and 42 intersect the beam at right angles. For a symmetrical case each edge is at 45° to the vertical (and the line of motion) as it intersects the beam. It will be appreciated that the same 90° angle of intersection is obtainable in an asymmetric case as shown in FIG. 2 where the edges 40 42a are at different angles to the axis of motion 34 but retain an included angle of 90°. In this case the change would also be reflected in equation (1) above. Other shapes are conceivable, i.e. curved edges but in this case their tangents at any height h should have an angle of intersection of 90°. Thus, if one edge is represented by the curve $f_2$ and the other by the curve $f_2$, then the curves are related by the differential equation $\dot f_1 = -1/\dot f_2$ where the dot notation indicates the differential.

One further consideration is that if the target is mounted to monitor movements of a structure relative to the laser beam as a spacial reference, then the target is designed to meet a predicted maximum deflection r which may be in any direction. That is there is a detection area represented by a circle of radius r. Such a circle 60 is shown in FIG. 2 with its centre C at the centre of the notch 36. The notch shape shown is efficient in terms of the target circle it provides, efficiency being expressed as the ratio of target circle area to notch area. The target would normally be set up initially with the beam axis 52 at the centre of the target circle. The notch base width w can be set as desired. Though as will be seen the width should not be reduced too far so that the edges 40, 42 cut the circle 60. The radius of the circle shown is half the total height of the notch.

It is not, of course, essential that a 90° angle of intersection be achieved over the whole target circle. This is the ideal. It should be noted that whatever notch shape is chosen, the relationship between h and L is to be monotonic. In the symmetrical case any line at right angles to axis 34 and intersecting an edge 40 or 42 should only intersect the edge at one point.

The device of FIG. 2 may suffer from some practical shortcomings. The plate would need to be well supported for guided horizontal movement. Unless the mechanism between the stepper motor and the plate for converting rotary to linear motion is chosen with care, it may introduce some degree of play or may have non-linearities in it. While the system described avoids the need to measure the plate position directly, it is assumed that this position is represented proportionally by the stepper motor position, but the assumption is only true if an error-free coupling between the two is provided. As already mentioned, the stepper motor position is a commanded position that is known and the expression of this in terms of the plate position can be performed in system 46 remote from the actual target location.

It is presently considered that a still more desirable device would be one which relied on a rotatable target connected directly to the stepper motor or by simple and reliable gearing, e.g. split gearing.

FIG. 3 shows one such target 100 which comprises a disc 101 of opaque material having a detection notch 102 therein bounded by two arcuate detection edges 104 and 106 and truncated by the circumference of an inner circular boss portion 108 to which is mounted the means (not shown) for transmitting rotary motion to the disc which rotates about its axis 110. The source of motion is again preferably a stepper motor. The outer edge of the disc is provided with an index notch or other mark 111 for establishing a reference position of the disc. The arcuate edges are mirror symmetrical about a radial axis 112. They do not provide a 90° angle of intersection with the axis 52 of laser beam 50 at all points of intersection. However, as will be further discussed below, a sufficiently close approximation is obtained in a range that extends from about 66° to 90°. Arcuate edges provide a readily-manufactured shape and are expressable mathematically in terms from which the beam position can be derived. In connection with derivation of the beam position the edges 104 and 106 provide a notch shape in which the angle of rotation from interception of the beam at one edge to interception at the other is a monotonic function of the radius at which the laser beam is positioned and the angular offset of the beam along the arc of a circle is measurable in an analogous way to the linear offset of the beam in the device of FIG. 2. If as discussed in connection with FIG. 2, detection of deviations of the disc 101 relative to the beam up to a certain radius in any direction is required, the target circle thereby defined is shown by circle 114 whose centre C lies on the axis 112 mid-way between the circumference of boss 108 and the outer circumference of the disc. Before going into these matters into greater detail, consideration will first be given to the general theory behind a rotational device.

Figure 4:
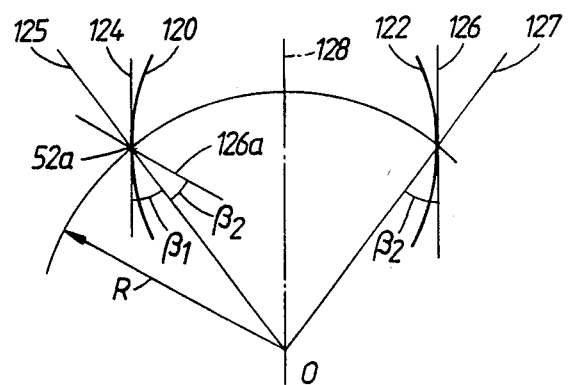
FIG. 4 shows geometry relevant to the development of the shape of the detection notch in a rotary target.

FIG. 4 shows a fragment of a disc of the character shown in FIG. 3, rotatable about its centre O and whose detection notch is bounded by curved edges 120, 122 only portions of which are shown in the vicinity of a radius R at which the axis of the laser beam lies from the centre O. It can be seen that on rotation of the disc the laser beam describes an arc (of radius R) relative to the disc. Take the case where the beam axis 52a at the radius R is just coincident with the edge 120. The tangent 124 to the edge 120 at that point makes an angle $\beta_1$ with the radial line 125 through point 52a. At the other edge 122, the tangent 126 thereto at radius R makes an angle $\beta_1$ to the radial line 127 through the point of intersection of the edge 122 and the circle of radius R.

If the disc is now rotated counterclockwise about its centre O to bring the edge 122 coincident with beam axis 52a, the tangent 126a to that edge in this position will lie at an angle $\beta_2$ to the radial line 125 on the opposite side of that line to angle $\beta_1$, which reflects the geometry with respect to line 127.

The angle of intersection at point 52a in accord with the above definition is $(\beta_1+\beta_2)$ and for the minimum area of uncertainty, $\beta_1+\beta_2=90°$. If the edges are symmetrical, i.e. mirror images, about a radial axis 128 that is angularly mid-way between radial line 126, 127, then $$\beta_1=\beta_2=\beta=45°.$$

This result should apply at any radius R. Theoretical considerations show that a curve that meets such requirements is of the polar form $$\text{ti } R=e^\theta$$

More generally if one edge is to have its tangent at any point lie at a constant angle to the radial line through that point, the tangent to which angle is k, then the two edges of the notch appear to be given by curves of the form:

$$R=e^{k\theta} \text{ and } R=e^{\theta/k} \text{ respectively.}$$

For the symmetrical 45° case, k=1.

It will be appreciated that an edge following such a curve has a decreasing, i.e. sharper, radius of curvature as the radius R decreases and that although the curve may approach the origin O as closely as desired, it cannot actually reach it.

Figure 5:
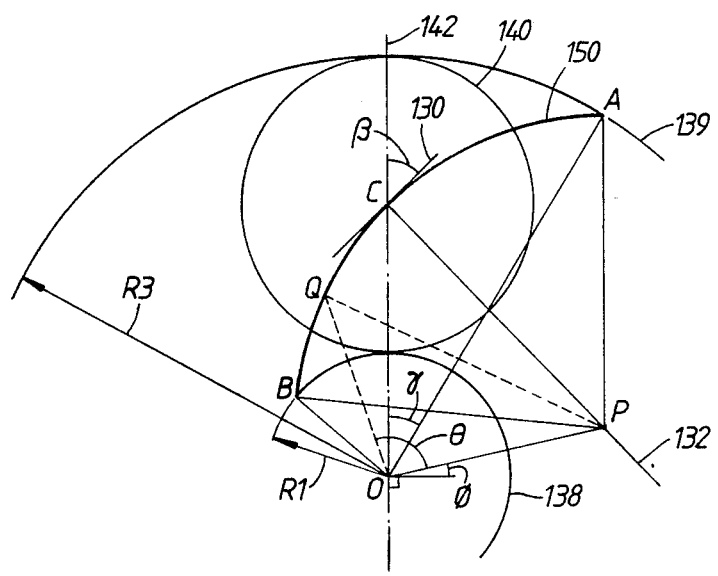
FIG. 5 shows geometry relevant to the development of the detection notch shape adopted in FIG. 3.

Consideration will now be given to how far an arcuate curve might sufficiently approximate the polar exponential form over a range such as shown in FIG. 3 between the inner circumference circle of a radius $R_1$ and the outer circumference of the disc of radius $R_3$. Reference is made to FIG. 5 which shows these two circles 138 and 139 respectively. Also shown is a target area circle 140 whose centre is mid-way between the two at a radius $(R_3+R_1)/2$ and of a $D=(R_3-R_1)$ so as to occupy the total radial extent between these two circles. The target is set up with the laser beam axis at the centre C of the target area circle. It will be assumed the detection notch is symmetrical and that, upon rotation of the disc, at the radius OC of the centre of the target area circle the tangent to each edge will make an angle $\beta$ of 45° to the radial line 142 through C, as shown with reference to FIG. 4. Line 130 represents the tangent to an edge 150 intercepting the beam at an angle of 45°. If the edge 150 is to be an arc of a circle, the centre P of that arc must lie on line 132 normal to line 130 and passing through the point C. If an arc is drawn to intercept both the inner and outer circles it is possible to choose the radius of that arc to intersect one of the two circles at 45° but not both. FIG. 5 shows the angle of intersection at point A on the outer circle, being the angle OAP between the radial line from the origin 0 of the outer circle ($R_3$) to the point (which is the same angle as between the respective tangents to the outer circle and arc 150 at point A).

It can be shown that the point at which the arcuate edge 150 should intersect the outer circle for angle OAP to be 45° is given by drawing radial line OA at an angle $\gamma$ (defined below) to the radial line 142 through the point C and then drawing the line AP at 45° to the line OA. Where line AP intersects the line 132 at P is the required origin for the arc of the edge 150 The angle $\gamma$ Y is given by $$\sin \gamma = (1-m^2)/(1+m^2) \qquad (3)$$

where $m=(R_3+R_1)/2R_3$, i.e. m is the radial position of the point C expressed as a fraction of the outer circle radius $R_3$).

If such edge 150 is drawn in the manner just described it will meet the 45° ideal at the centre and radially outer edge of the target area circle and should not deviate far from this at intermediate radii. However, such an arc will tend to meet the inner circle of radius $R_1$ at too shallow an angle. As the ratio of $R_1/R_3$ becomes smaller the arc would become tangential to the inner circle and then not touch it at all. It will be noted from the general equation $R=e^\theta$, that as the radius becomes smaller the instantaneous radius of curvature becomes smaller, i.e. the curve becomes tighter. One could look, therefore, to define the edge 150 by an outer arc portion as described above and an inner arc portion of smaller radius of curvature with its centre also on line 132 so that the two arc portions are co-tangential at point C. This task is complicated by the fact that, in the case under discussion where edge 150 is one of a pair of symmetrical edges, then if the angle of rotation of the disc between the interception of the beam by one edge and the other is to be a monotonic function of the radial position of the beam, any radial line from origin O that intersects edge 150 must not intersect it at more than one point. This is equally true of the other edge. Thus the inner portion of edge 150 must not be curved so sharply as to defeat this requirement.

It is presently preferred to make edge 150 a single arc as already indicated. By adjusting the radius of the arc 150 to allow the intersection at the outer circle to fall below 45° (while maintaining 45° at the centre of the target area circle), the angle of intersection OBP at the intersection point B at the inner circle is increased, OBP being the angle between the radius OB of arc 150 and the radius OB of the inner circle at the intersection point B. This is done by having a lesser radius for the arc, that is by moving point P along line 132 towards the point C.

It is emphasised that although the discussion above has been directed to the ideal angle of intersection of 90°, it is an important feature of the present invention to provide a device in which the position of a laser beam or other object, tangible or not, can be measured by means of motion confined to a single direction, whether along a linear axis or about a rotational axis, with a target detecting shape that enables the position of the object to be ascertained by movement to or fro in that single direction. This may be achieved by shapes which do not provide 90° angles of intersection. As shown, however, it is desirable for accuracy to look to achieving or at least approaching such a goal. For any practical device it is necessary to achieve the monotonic relationship already discussed, to achieve a reasonable target area circle relative to the size of the disc, and to provide a device of sufficient strength and rigidity.

The design of a structure using an edge 150 that is a single arc ACB of a circle will now be further considered with reference again to FIG. 5.

A practical value for the central boss is to choose $R_1$ to be 1.4D which gives $R_3$ to be 1.4D. This is found practical in terms of the rigidity of the disc and the ability to support it for rotation at the central boss. FIG. 5 is drawn approximately to these proportions for illustrative purposes. The centre C of the target area is at the distance OC (=0.9D) from the centre O of the disc.

The line OP makes an angle $\phi$ with the normal to OC. By considering the perpendicular distance from OC to P it can be seen that:

$$CP \sin 45 = OP \cos \phi$$

$$CP = OP \cos \phi / \sqrt{2}$$

It can also be shown that:

$$OP = OC/(\sin \phi + \cos \phi), \text{ and thus that:}$$

$$CP = OC/\sqrt{2}.(1+\tan \phi)$$

Thus a value of CP, the radius of the arc ACB ($=R_4$); can be obtained for a series of values of $\phi$. Likewise corresponding values of OP are obtainable. OP ($=R_2$) is the radius of the circle about which the centre of the arc ACB moves as the disc rotates.

The values of CP can be related to the angles OAP and OBP. It can be shown from triangle OAP in which $AP=CP=R_4$ that:

$$\cos O\hat{A}P = \frac{R_3^2 + CP^2 - OP^2}{2 \cdot R_3 \cdot OP}$$

Similarly from triangle OBP in which $BP=CP=R_4$ that:

$$\cos O\hat{B}P = \frac{R_1^2 + CP^2 - OP^2}{2 \cdot R_1 \cdot OP}$$

Thus it becomes possible for a given value of OC to obtain for a series of values of $\phi$ the corresponding values of CP ($=R_4$), OP ($=R_2$), $O\hat{A}P$ and $O\hat{B}P$.

For the illustrated example where OC=0.9 D, for $\phi=0°$ then:
$R_2(OP)=0.9$ D $R_4(CP) = 1.273$ D
$O\hat{A}P = 39.0°$.
$O\hat{B}P = 17.7°$.

In this case $\phi$ angle $O\hat{A}P$ is reasonably close to 45° and would be closer still by making $\phi$ negative, but angle $O\hat{B}P$ is too small and would be smaller still if $\phi$ were made negative. It can be shown that the value of $O\hat{A}P$ steadily decreases and that of $O\hat{B}P$ steadily increases as $\phi$ increases. For example for $\phi = 11°$, then $R_2 = 0.768$ D
$R_4 = 1.066$ D
$O\hat{A}P = 32.9°$
$O\hat{B}P = 34.1°$.

For $\phi = 10°$, $O\hat{A}P$ and $O\hat{B}P$ are approximately equal and are each about 33°. At this value $R_2 = 0.777$ D and $R_4 = 1.066$ D.

Thus there is obtained an arcuate edge 150 which in the symmetrical structure contemplated gives an angle of intersection of 90° at the centre of the target circle area, with the angle reducing to 66° the inner and outer radial limits. This is considered acceptable.

A further deduction can be made from the geometry of FIG. 5. We have now fixed the position of the arc ACB and its centre P having defined that the tangent to the point C chosen to be at a given radius OC is at 45° to OC. This definition arose from assuming that the edge 150 was intercepting a laser beam positioned at the point B. The triangles OCP, OAP and OBP represent the geometries existing for interception by the edge 150 of a laser beam at given radius OC and at the outer and inner radial limits respectively. All these triangles have the two sides defining the apex P equal. That is, $AP = CP = BP = R_4$ and $OP = R_2$ in common. The remaining sides OA, OC and OB are the radial distances from the centre O. These are specific known cases. If the laser beam moving with respect to the disc around a circle of some unknown radius R intercepts the edge 150 at point Q, then the triangle OQP has $PQ = R_4$, $OP = R_2$ in common with the specific cases and $OQ = R$. If the angle $P\hat{O}Q = \theta$, then:

$$R = (R_4^2 - R_2^2 \sin^2\theta)^{\frac{1}{2}} + R_2 \cos\theta \qquad (3)$$

Since OP is a fixed datum on this disc, the angle $\theta$ can be derived from the angle of rotation of the disc between the two positions at which the symmetrical detector notch edges intersect the laser beam.

Various procedures for doing this can be devised as will now be described referring once again to FIG. 3. The geometry of the disc construction described briefly earlier will be better appreciated in the light of the discussion of FIGS. 4 and 5. The left-hand edge 104 of FIG. 3 has the same geometry as the edge 150 as will be appreciated by imagining the disc of FIG. 5 to be rotated 45° anticlockwise. A circle centered on the disc centre 110 through the target circle centre C intersects the edge 104 at $C_1$. Point 110 corresponds to origin O in FIG. 5 and will be referred to as such. A radial line 142a through $C_1$ is at 45° to the axis of symmetry 112 which means that for the 45° intersection at $C_1$ the centre $P_1$ of the arc (of radius $R_4$) defining edge 104 lies on a horizontal line through $C_1$ where that line is intersected by a radial line from the origin O drawn at $\phi$ (10° in the example above) to the normal 142b to line 142a through origin O. As the disc rotates, $P_1$ moves round the circle of radius $R_2$. The other edge 106 is symmetrically disposed which in this case means that the target centre circle intersects the edge at $C_2$ on the radial line 142b. The centre of the arc of radius $R_4$ defining the edge 106 lies at $P_2$ which is at $R_2$ from origin 110 and on the same horizontal line as $P_1$, though as will become clear below the latter fact is a special case. The laser beam whose axis 52 is at some unknown radius R will be intercepted by the edges 104 and 106 at points $Q_1$ and $Q_2$ respectively. The triangles $OQ_1P_1$ and $OQ_2P_2$ have sides of $R, R_4$ and $R_2$ similarly to the triangle OQP of FIG. 5 and R is obtainable from equation (3) above, where $$\theta = P_1\hat{O}Q_1 = P_2\hat{O}Q_2.$$

We thus need to know $\theta$ in terms of the angle $\epsilon$ which is the total angle of rotation of the disc between points $Q_1$ and $Q_2$. It can be shown for the illustrated case where $C_1\hat{O}C_2$ is 90° that $$\theta = \epsilon + 2\phi - 90°.$$

More generally if angle $C_1OC_2 = \delta$ then $$\theta = \epsilon + 2\phi - \delta \qquad (5)$$

The more general case arises because it will be seen that edges 104 and 106 can be moved angularly together or further apart about origin O retaining the basic geometry. $P_1$ and $P_2$ no longer lie on a common line and the normal to one radial line 142a, 142b will no longer coincide with the other. This is the rotational equivalent of moving the edges 40 and 42 of FIG. 2 linearly apart or together. In the case of FIG. 3 it will be seen that the edges cannot be moved much nearer together without encroaching on the target area circle 114.

As shown in FIG. 3 the beam axis 52 is shown offset from the axis 112. As with the linear case described earlier, provided the stepper motor driving the disc is established with an initial reference position. The two angles $\epsilon_1$ and $\epsilon_2$ between the beam axis 52 and the edges 104 and 106 respectively are obtainable so that $\epsilon = \epsilon_1 + \epsilon_2$ and the offset angle $\rho$ and its direction is given by $(\epsilon_1 - \epsilon_2)$. Again measurement of any two of $\epsilon$, $\epsilon_1$ and $\epsilon_2$ would suffice.

Upon obtaining $\epsilon$, the radius R at which the laser beam lies is given by use of equations (4) and (5). The Cartesian coordinate position (x,y) of the beam relative to the origin O is then given by $$\left. \begin{array}{l} x = R \sin\rho \\ y = R \cos\rho \end{array} \right\} \qquad (6)$$

or relative to the centre C of the target area circle by $$\left. \begin{array}{l} x = R \sin\rho \\ y = R \cos\rho - OC \end{array} \right\} \qquad (6a)$$

To recap on the preferred proportion of the disc referred to the diameter D of the target area circle:
Disc radius $(R_3) = 1.4$D
Centre Boss radius $(R_1) = 0.4$D
Radius at which $P_1$, $P_2$ lie $(R_2) = 0.77$D
Radius of arc of edges 104, $106 = 1.07$D
This gives an angle of intersection ranging from 90° at the radius of the target area circle centre C to 66° at the inner and outer radii $R_1$ and $R_3$ respectively.

Figure 6:
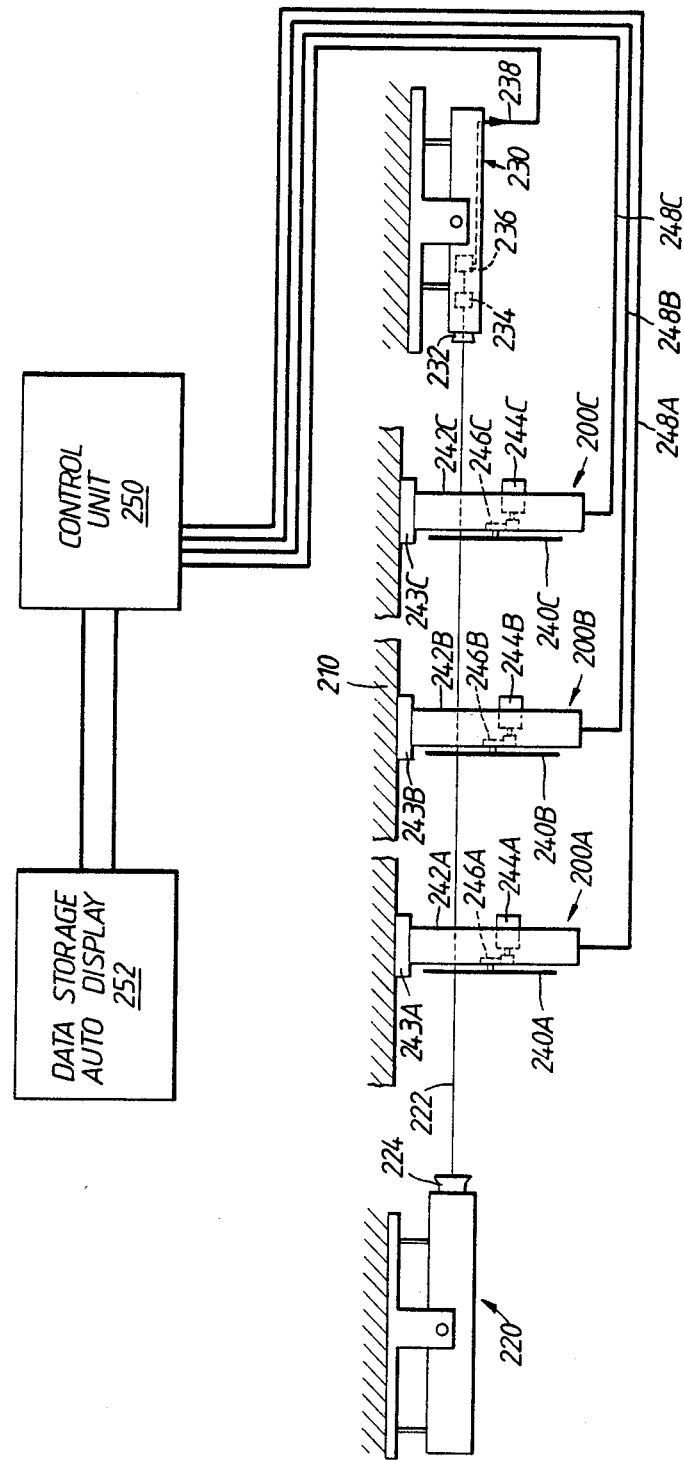
FIG. 6 shows diagrammatically a structural monitoring system using a plurality of targets such as shown in FIG. 3.
Figure 7:
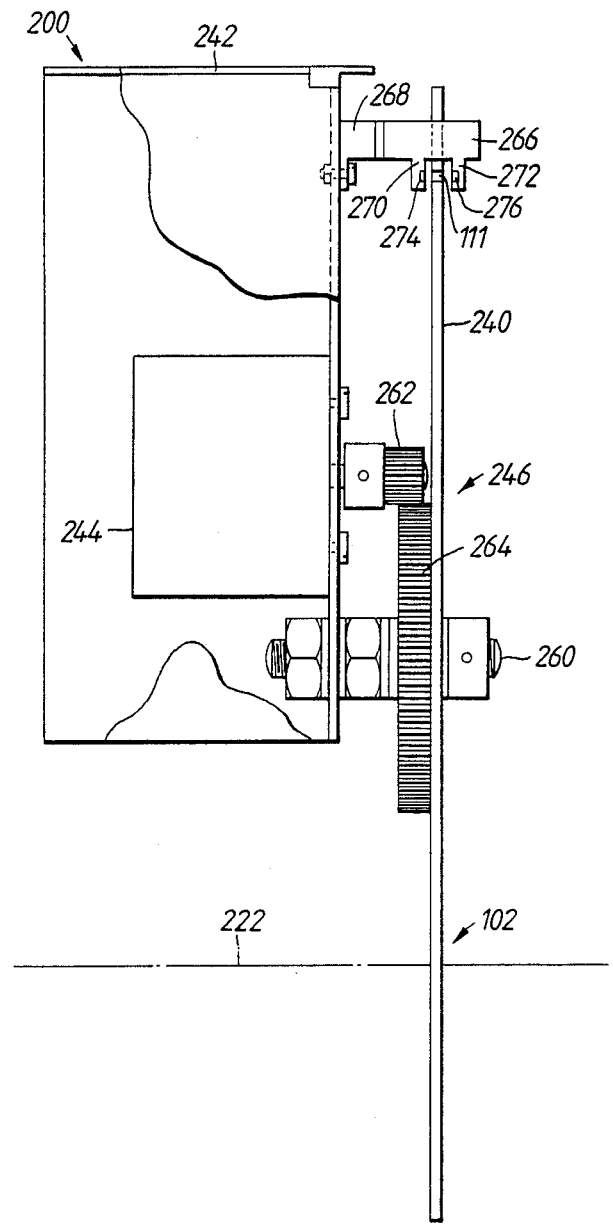
FIG. 7 shows a side view of one of the targets of FIG. 6 with the enclosure and drive means therefor.

Consideration can now be given to the practical use of the disc, referring to FIGS. 6 and 7 in which FIG. 6 shows a structural monitoring system incorporating a plurality of disc targets and FIG. 7 shows a mounted target in greater detail.

In FIG. 6 three target units 200A, B and C are shown mounted at points along a structure 210 that is to be monitored. At points remote from the monitored structure are mounted a laser transmitter 220 that directs a beam 222 of laser light to an aligned beam receiver 230. The transmitter 220 may use a lower power helium-neon laser operating in the visible red and include output optics 224 to determine divergence of the beam. The receiver 230 includes input optics 232 that direct the received radiation onto a photo-detector 234 sensitive to the wavelength of the transmitter laser and connected to supply an electrical signal dependent on the intensity of the received laser light to a threshold detector circuit 236 that is level-sensitive, e.g. using a Schmitt-trigger circuit, which provides an output signal on line 238 indicating that the received light is above the trigger level or below it. Thus the receiver makes a decision as to when the received radiation is interrupted. The beam is set up to pass alongside the structure to be monitored. Each target unit 200A, B and C includes a respective target disc 240A, B and C seen edge on in the figure and having the shape described with reference to FIG. 3. The discs are initially oriented so that the laser beam passes through or at least close to the centre C of the target area circle seen in FIG. 3. Each disc is mounted to an enclosure 242A, B and C respectively for rotation about its centre in a plane normal to the beam 222. Each enclosure is rigidly mounted by a sturdy support 243A, B and C respectively to the structure 210. Each enclosure houses a respective stepper motor 244A, B and C coupled to the associated disc through simple accurate gearing 246A, B and C respectively. The stepper motors are mounted away from the detection notches of the discs, i.e. adjacent the lower disc portion see in FIG. 3.

The stepper motors are connected over respective cables 248A, B and C to a control and measurement unit 250 with an associated display and data storage/analysis unit 252. The targets are sequentially operated under control unit 250 to rotate each disc from a reference position and thereby obtain the angles $\epsilon_1$ and $\epsilon_2$ discussed in relation to FIG. 3. All the angles are represented by step number positions of the stepper motors. The interception of the beam by a notch edge 104, 106 (FIG. 3) is detected by a change of state of the receiver output line 238. The step numbers are noted at each interception point. After a disc is operated it is returned to its reference position to allow free passage of the laser beam therethrough for operation of one of the other targets. Thus any number of targets may be employed.

The laser transmitter/receiver arrangement shown enables any permanent loss of the beam to be noted or loss of alignment between the transmitter and receiver.

FIG. 7 shows one form of target unit 200 in greater detail. The same reference numerals will be used as for the target units 200A, B and C but without any suffix.

Unit 200 has an enclosure 242 which is shown partly broken away and the upper part of which is to be secured by means not shown to a support that in turn is secured to the structure being monitored. It will be appreciated that the precise construction of the support and its mounting will be dependent on the particular installation. The target disc 240 is mounted for free rotation about a pin 260 having one end secured to the lower part of the housing. The part of the target containing the detection notch 102 (FIG. 3) depends below the enclosure 242 to allow passage of the laser beam 222 therethrough. The stepper motor 244 is mounted within the enclosure and is connected to the target by gearing 246 comprising a smaller gear wheel 262 that is secured on the output shaft of the stepper motor and that meshes with a larger gear wheel 264 mounted on pin 260 and secured by means not shown to the target disc. It will be noted that the gearing 246 provides a step down in the angular motion of the target disc. Such simple gearing, which may use split-gears, also provides an accurate proportionality between the motion of the target-disc and the commanded position of the motor. To establish the reference position of the disc (and possibly avoid ambiguity in the electronic counting) the notch 111 therein (FIG. 3) locates in the quiescent position between a bifurcated device 266 bridging the upper peripheral portion of the disc. Device 266 has a portion 268 secured to project from the wall of enclosure 242 with bifurcated arms 270 and 272 carrying for example a light emitting diode 274 and photo-diode 276 which are only in communication when notch 111 is positioned between them. This is signalled to the control unit 250. This establishes the reference position of the disc but does not have to be done with great accuracy. The unit 252 (FIG. 6) will store a count value representing a precise position of the disc in its quiescent state and the intercept count values upon activation will be referenced to this. After an operation the disc can be commanded back to the reference count value.

Figure 8:
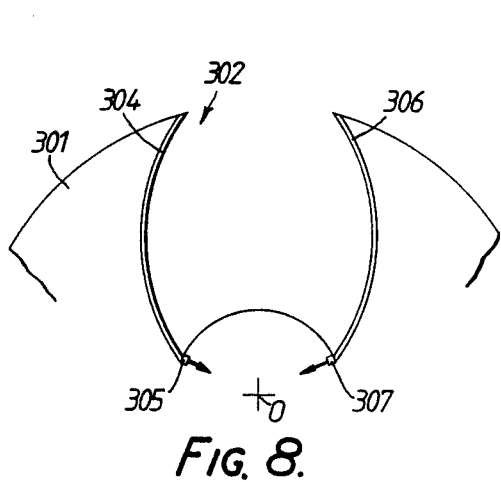
FIG. 8 shows a modification to the target disc of FIG. 3.

FIG. 8 shows a modification of the target disc to allow the interception of the beam to be actually noted at the disc itself. The figure shows a portion of a target disc 301 having the detection notch 302 which is of the proportions of notch 102 of FIG. 3. The edges 304 and 306 are defined by some light-sensitive means for example an array of photo-diodes or optical fibre ends or a strip of material transparent to the laser wavelength by means of which light impinging on the edge is conducted to a respective photo-diode 305, 307 mounted at the inner end of each optical conductor. Only an on-off type of detection is required.

Although this arrangement does mean more complexity in each target unit, it enables the separate receiver (230 of FIG. 6) to be omitted in that each target unit provides its own receiver. Also it obviates the need for the laser transmitter to be maintained in a fixed alignment. A succession of such target units spaced along the beam would show a proportional shift of the beam which can be separated from individual movements of the target units relative to the beam.

Figure 8A:
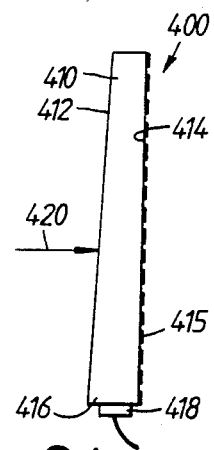
FIG. 8A shows a side view of one implementation.

Referring to FIG. 8A, this shows a fragmentary side view of an edge detector arrangement 400, i.e. looking at one detector edge from the target circle area. It is assumed the laser beam is impinging on the detector arrangement from the left as seen in the figure. The detector comprises a strip 410 of material transparent at the laser wavelength and of good optical quality. For a laser beam in the visible red the strip may be of Perspex. The front and rear surfaces 412 and 414 respectively of the strip 410 (with respect to the direction of the laser beam) are non-parallel. As shown the rear surface 414 is substantially normal to the beam axis and the front surface 412 at a small angle so that there is a wedge shape whose wider end is radially inward. The rear surface is preferably given a reflective coating or backing 415. At the thicker end 416 of the wedge shape a photo-diode 418 is mounted. A ray 420 of the laser beam entering the front surface is directed by multiple reflections between the angled front and rear surfaces to the thicker end 416 of the wedge. For this purpose, the wedge shape is not critical and the angle between the surfaces need only be a few degrees.

The internal reflection process may be enhanced by abrading or irregularly scoring both the front and rear surfaces 412 and 414 to create large numbers of small facets for internal reflection. The facets are small relative to the beam cross-section. Although many of these facets will direct light other than in the wanted direction, experiment indicates that in practice a good proportion of the laser light reaches the lower end of the wedge for detection by the photo-diode.

The lower end 416 of the wedge 410 may also be finely abraded to provide a diffuse illuminated area to which the photo-diode 418 is attached.

Since the strip 410 is relatively thin in the plane of the disc to which it is fitted, in practice it may be readily bent to a curved shape such as indicated in FIG. 8 and without significant loss of light at the photo-diode 418. Strip detectors of this kind can be used on single edges as in FIGS. 8 or 9 or to define the sides of a curved slot such as in FIG. 10 to be described.

In many circumstances in which structural monitoring is required the expected structural movements are slow. It could be assumed that the beam would not move relative to the disc axis during the period that one measurement was being made. There may, however, be circumstances where movement could occur during the course of a measurement. For example, the monitoring of structures such as large ships or oil-rig platforms subject to continual and repeated flexing.

Figure 9:
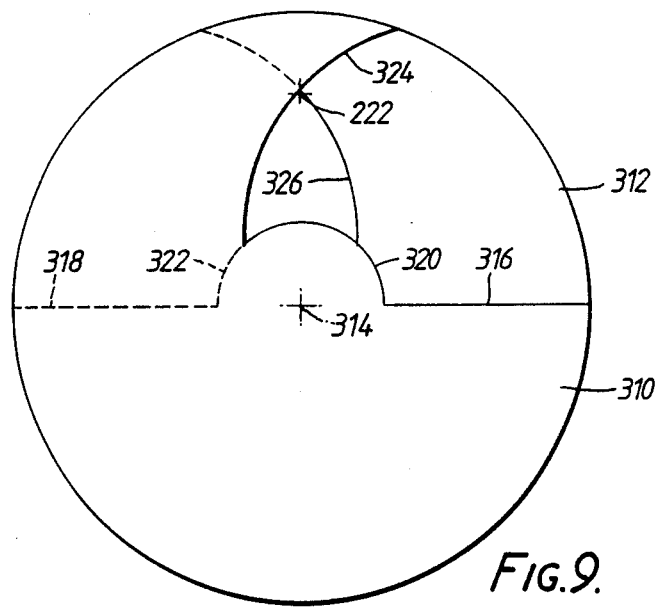
FIG. 9 shows a tracking disc assembly based on FIG. 3.

An answer to this problem is to have both detection edges maintained at the point of interception. For example, FIG. 9 shows an arrangement in which a pair of coaxial discs is used one providing each edge. The discs 310, 312 are mounted for separate rotation about a common axis 314. Each disc has an approximately quadrant segment 316 and 318 respectively cut out but leaving a central boss portion 320, 322 respectively of radius $R_1$ (as defined previously). Disc 310 has the anticlockwise edge 324 of the quadrant formed as an arc between portion 320 and its outer circumference in accord with detection edge 104 of FIG. 3. Disc 312 has the clockwise edge 326 of the quadrant likewise formed in accord with detection edge 106 of FIG. 3. The two discs are independently rotatable as shown in FIG. 11 (described below) to maintain them just on the point of interception of the laser beam axis 222.

In this case the control unit 250 of FIG. 6 would be in a feedback loop through receiver 230 to maintain the two discs just intercepting the laser beam so that at any sampling instant the angular positions of the discs could be read from the respective stepping motor positions. Such operation could be performed using plain detector edges and the separate receiver, or the light-sensitive edges as in FIGS. 8 and 8A.

Figure 10:
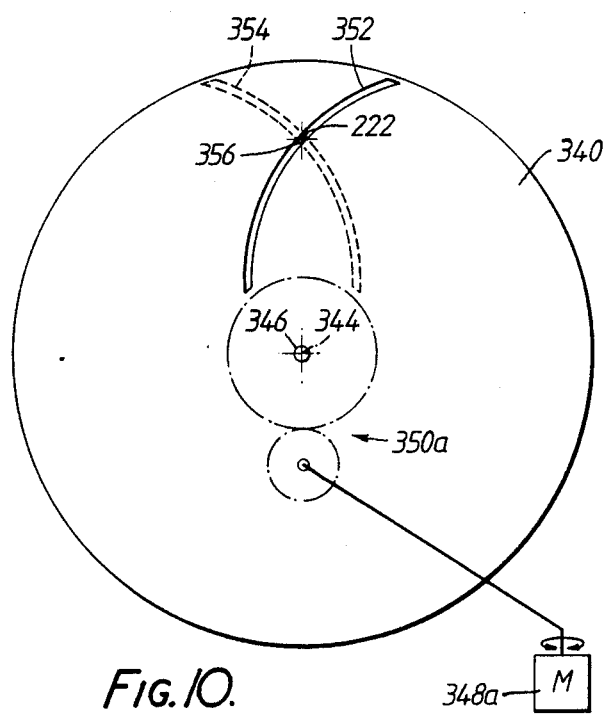
FIG. 10 shows another tracking disc assembly based on FIG. 3.
Figure 11:
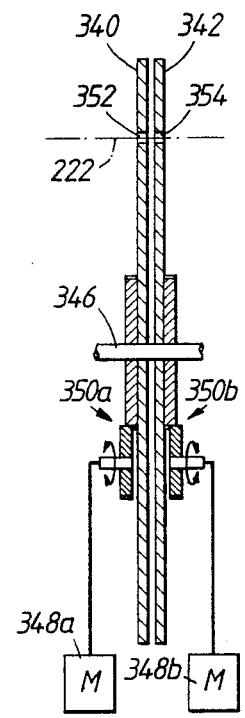
FIG. 11 shows a vertical axial section through the assembly of FIG. 10.

Another version of the self-tracking device is shown in FIGS. 10 and 11 in which there are two adjacent discs 340, 342 mounted for rotation about a common axis 344, e.g. mounted on a shaft 346 and each driven by a respective stepper motor 348a, 348b through reduction gearing 350a, 350b respectively as above described. Each disc has a single narrow slot cut therein, slot 352 in disc 340 following the curve of detection edge 104 in FIG. 3 and slot 354 in disc 342 following the curve of edge 106 in FIG. 3. In this case the beam axis 222 is maintained by the feedback control loop in the overlap area 356 of the two slots which allows the beam to pass through the disc assembly.

The slots are made light sensitive on each side of the slot similarly to FIGS. 8 and 8A so that a relative movement of the beam to one or other side of a slot is detectable by comparing the outputs from the detector diodes at the sides of the slot. Appropriate correction is made to the disc position to maintain the overlap area 356 aligned with the beam axis.

Although this form of construction requires two motor drives, the coaxial assembly is compact and provides the advantage of fast read out of the instantaneous beam position where the beam and disc assembly may be moving continually relative to one another.

The calculation of the beam position in terms of a disc centre or a notional target area centre can be carried out in various ways. The results derived above are ones amenable to calculation using conventional techniques.

The invention has been described in terms of a light transmissive area defined by one or a pair of opaque plates or discs. It will be appreciated that particularly with the embodiments of FIGS. 2 and 3 a converse structure could be realised in which the detection notch is opaque, i.e. of solid material, with external edges defining the detection edges. The opaque notch can be held out of the beam to allow the latter to pass other than when detection of the beam position is required.

It will be appreciated that those embodiments in which the target also acts as the beam detector enables the system to be established in circumstances where there are no fixed points to mount a receiver and transmitter to establish a spacial reference. As above indicated, a plurality of tracking targets can be set up along the beam. A shift of the laser beam relative to all the targets causes a shift of all targets.

The invention has been more particularly described in the context of measuring displacements of a target mounted on a structure that moves relative to the fixed spacial reference. The foregoing paragraph emphasises the generality of application to measuring relative movement. Another instance of application is in alignment where two bodies or parts, one carrying a laser and one carrying a target, are adjusted to a predetermined position.

The laser beam may be continuous or modulated, e.g. using known chopping techniques. As is known modulated beam techniques with appropriate receiver detection can be used to improve signal-to-noise ratios.

In describing the practice of the invention thus far, FIG. 6 has illustrated how a remote receiver 230 may be located some distance away from the laser transmitter. It will be appreciated that at the receiver any beam movement is at its greatest. To ensure capture of the beam by the receiver, the receiver input could use a lens or reflector, e.g. a parabolic reflector, having an aperture large enough to capture beam movement and to focus the beam onto the receiver optics.

To recap on the target structures of the rotational kind that have been disclosed, they may be broadly divided into two forms. In one form, such as illustrated in FIG. 3, a laser-beam detection area is defined between two fixed edges that in a specific embodiment are formed as arcs of circles. Rotation of the structure to intersect the beam with one and the other edge is used to derive the position of the beam relative to the target structure. In another form, each edge is provided on a separately rotatable portion of a composite target structure whereby each edge can be held at or adjacent the beam to follow beam movements. A structure of this form is disclosed with reference to FIG. 9.

In each form of structure it is the rotational position of each edge at the intersection with the beam that is required to be measured. One way of detecting such intersections at the target itself is to provide each edge with a light conductor or guide into which the beam enters and causes light to be directed to a sensing diode. An arrangement of this kind is disclosed with reference to FIGS. 8 and 8A and is applicable to both forms of target structure discussed above.

The arrangement of the just-mentioned FIGS. 8 and 8A involves loss of light though in many cases more than enough is available from the laser beam to enable losses to be tolerated. However, there may be circumstances where an improved efficiency of the use of the laser beam power is desirable for enhanced signal-to-noise ratio. It is proposed that each detector edge of a target structure comprises a reflective surface at an angle to the plane of rotation of the structure so as to reflect a laser beam impinging thereon transversely of the structure to a detector mounted on the structure. Preferably the edges are arcs of circles as already described and respective light-detector means is located at the centre of each circle. Such detector means can be an opto-electronic device, e.g. a photo-diode mounted at the centre point, or a light guide such as an optical fibre having its end at the centre point and conducting the received light to a more remotely positioned opto-electronic device. The benefit of this latter arrangement will become clear from the following description.

Figure 12:
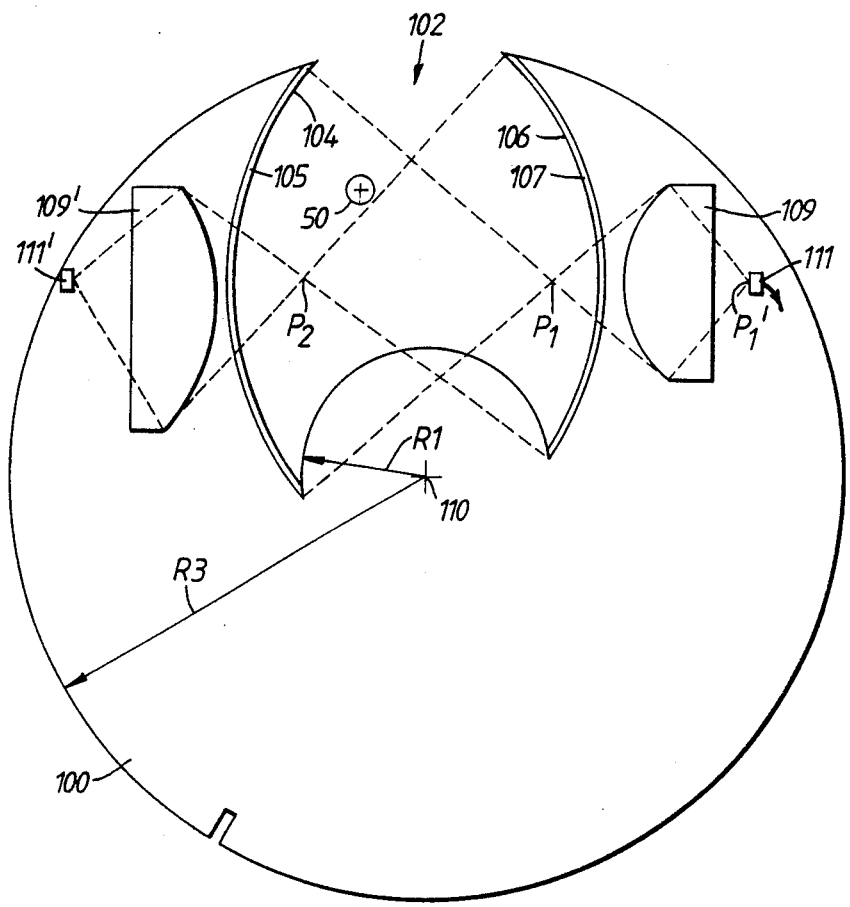
FIG. 12 shows a target structure having two fixed reflective edges in accord with the invention and showing similar detector arrangements for laser light reflected from each edge.
Figure 15:
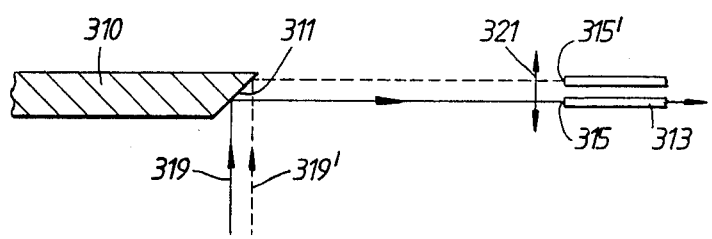
FIG. 15 illustrates the reflection from different points on an edge as a means for tracking beam position.

Referring now to FIG. 12 there is shown a target structure based on FIG. 3 and having an opaque disc 100 with a notch or aperture 102 bounded by arcuate edges 104 and 106. A laser beam 50 is directed through the notch 102 normal to the plane of the disc and its position is determined by the intersections of the beam with each edge by rotation of the target structure about disc axis 110. Each edge 104, 106 is an arc of a circle centered at $P_1$, $P_2$ respectively within the notch area. In the present embodiment each edge has a chamfered or bevelled portion 105 and 107 respectively to provide a reflective surface at 45° to the plane of the disc and the beam axis. The chamfered edge is seen in FIG. 15 denoted 311. The width of this reflective surface may conveniently be about 4 mm. It will be seen that the effect of a reflecting edge is to reflect a beam intersecting the edge parallel to the plane of the disc and the effect of the circular arcs is that the reflected beam is always directed towards the centre of the circle. Thus a detector can be placed at each centre $P_1$, $P_2$ to detect the beam reflected from the relevant edge. The beam is detected at or close to its full intensity at the target giving high signal-to-noise ratios.

The physical location of a detector device at each of points $P_1$ and $P_2$ would impede the fullest use of the detection area of the notch 102. This can be overcome by placing a lens on the disc at the adjacent edge that intercepts any reflected beam passing through the centre point. This is shown for one edge where the lens 109 intercepts light over the whole arc subtended by edge 104 at point $P_1$. In this case the subtended angle is large and the light-collecting length of the lens is rather large due to its physical spacing from $P_1$. The length of the lens can be reduced by reducing the angle subtended by edge 104, that is by increasing the ratio R1/R3 and/or by moving the detection edges angularly closer together about axis 110 so as to bring P2 and P1 nearer the edges. The steps are possible at some sacrifice of the total area over which beam movement can be detected.

The lens 109 is a cylindrical lens imaging point Phd 1 as a line at a point $P_1'$ where a photo-diode 111 is located. This may actually be housed within the lens. A similar arrangement 109', 111' is provided for reflection from the other edge.

Figure 13:
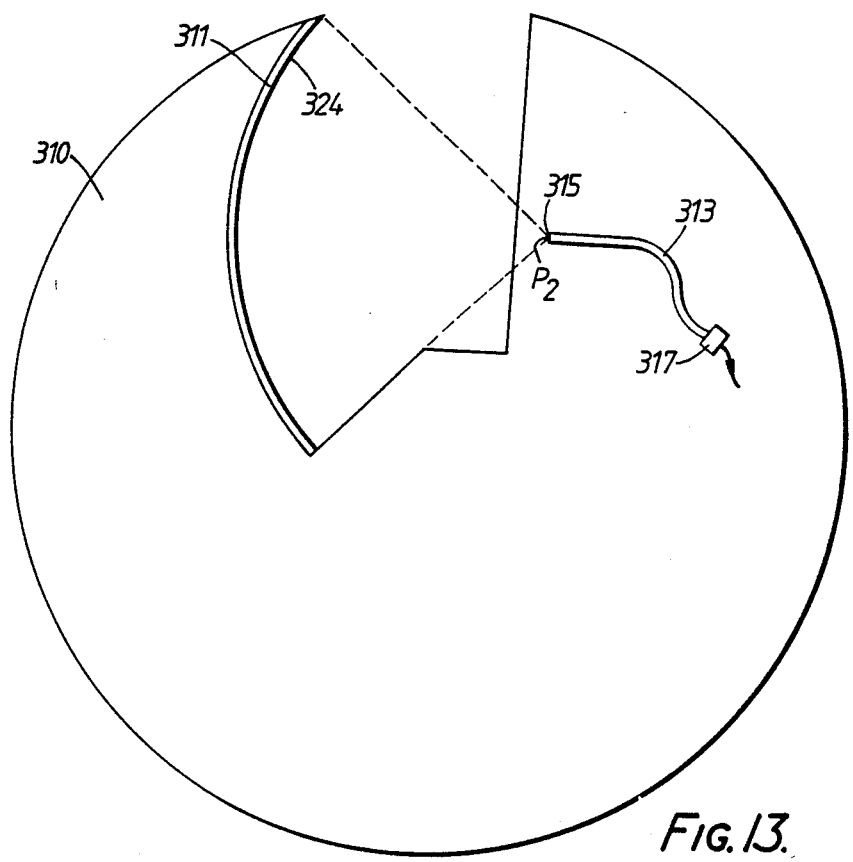
FIG. 13 shows one part of a composite target structure having a reflective edge and the detector arrangement therefor.

Turning now to FIG. 13, this shows one disc 310 of a pair arranged generally in the manner shown in FIGS. 9 and 11. It will be seen from those figures that the detector positioning problem is eased because the centre of each edge arc will lie in an area overlapped by the other disc. Thus in FIG. 13 the disc 310 has a single circular arcuate edge 324 which has a chamfered reflective portion 311 at 45° to the disc plane to reflect impinging laser light toward the centre of the edge arc denoted $P_2$. In this case a photo-diode or other detector device could be located directly at point $P_2$. However, what is illustrated is the use of an optical fibre 313 whose end 315 is arranged to collect the reflected laser light and guide it to the detector 317, through a filter if desired.

The other disc of the pair is likewise provided with a reflecting edge and detector arrangement to form a composite structure to operate as a tracking target as described earlier. If the target is to be one of a series along the laser beam, the control of the target discs can be such that the beam position is measured by successive targets, the discs of the target being moved to intercepting position for measurement and then being stepped back a little to remain close to the beam position but allowing free passage of the beam to the next target.

Figure 14:
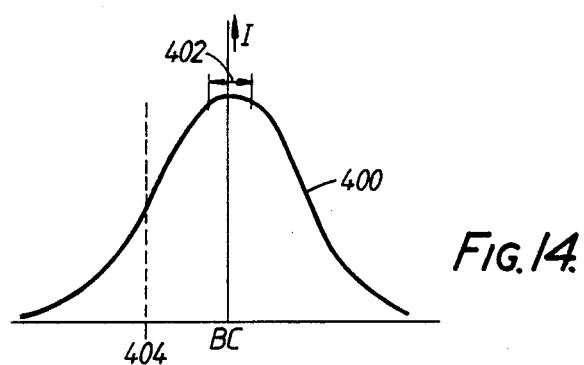
FIG. 14 illustrates the typical light distribution across the cross-section of a laser beam and the manner in which it is used to track the position of the beam.

It is presently preferred that the detection of the intersection point of the reflected beam is determined by the centre of the beam just falling on the reflective edge. As seen in FIG. 14 a laser beam has a Gaussian intensity (I) distribution 400 over its cross-section. The beam centre is denoted BC. It is preferred to determine interception of the beam by finding a signal level indicative of the peak at the central portion of the beam such as denoted by 402. By having level-sensitive detection, advantage can be taken of the Gaussian distribution curve to enable a target to rapidly follow changes of beam position relative to the target. If the edge of the beam just sits on the reflective edge portion at a point such as 404, a shift of the beam further onto or away from the edge should produce a corresponding increase or decrease in the detected signal indicating the direction of movement of and the direction in which the relevant disc is to be turned to track the beam.

Another directional sensor is shown in FIG. 15 which shows a section in the axial direction through a disc such as 310 with a reflective edge portion 311 reflecting the laser beam denoted by full line 319 to the end 315 of optical fibre 313 mounted at the other side of the notch area. The mounting of the fibre end may be arranged to be adjustable relative to the plane of the disc as shown by double-headed arrow 321 so as to adjust the point of impingement of the laser beam on the reflective edge 311 at which detection is signalled. Furthermore a pair (or more) of optical fibres can have their ends stacked normal to the plane of the disc as shown by second end 315' to allow the lateral direction of movement of the beam to be sensed as indicated by a displacement of the beam to the position indicated by dotted line 319'.

We claim:

1. A target apparatus for detecting the position of a laser beam, comprising:
   (a) a body mounted for rotation about an axis, said body having first and second edges lying in plane normal to said axis and extending in angularly spaced-apart relationship with respect to said axis to define therebetween an aperture allowing transmission of a laser beam therethrough, said edges being shaped such that as a function of radial distance from said axis the angular spacing between said edges is a monotonic function of the radial distance,
   (b) means for determining a reference position of the body that allows transmission of the laser beam through said aperture,
   (c) drive means coupled to said body for reciprocating said body about said axis with respect to said reference position such that the body is turned in a first direction to cause said first edge to intersect the beam and in a second, opposite direction to cause said second edge to intersect the beam, and
   (d) means for determining the respective angular positions of said body at said first and second intersections such that the spatial position of the laser beam relative to the target apparatus is determinable from a knowledge of the reference position and of the respective angular positions at said first and second intersections.

2. A target apparatus as claimed in claim 1 in which the drive means comprises a stepper motor and in which said reference position is constituted by a predetermined step position of said stepper motor and said angular positions at said first and second intersections are determined in terms of the corresponding step positions of said stepper motor.

3. A target apparatus as claimed in claim 1 in which each of said edges comprises an arc of a circle extending between an outer and an inner radial limit, each arc being concave as seen from the other.

4. A target apparatus as claimed in claim 3 in which a tangent to each arcuate edge at a point on the edge lying at a radial distance midway between said inner and outer radial limits is substantially at 45° to a radial line extending through said point.

5. A target apparatus as claimed in claim 1 in which at first and second points on said first and second edges, respectively, lying at a same radial distance from said axis, respective tangents thereto at the respective points of intersection with the beam define an angle of intersection of 90°.

6. A target apparatus as claimed in claim 5 in which the respective tangents to the first and second edges at said first and second points are each at 45° to a radial line through the respective point.

7. A target apparatus as claimed in claim 1 in which said first and second edges comprise respective means at the edge for detecting the intersection of a laser beam therewith.

8. A system for monitoring movements of a natural or man-made structure, comprising:
   (a) a laser source for directing a laser beam along a path adjacent the structure to be monitored; and
   (b) at least one target apparatus mounted to a portion of the structure for movement therewith relative to the beam path, said target apparatus comprising:
   (c) a body mounted for rotation about an axis, the body having first and second edges lying in a plane normal to said axis and extending in angularly spaced-apart relationship with respect to said axis to define therebetween an aperture allowing transmission of the laser beam along said path therethrough, said edges being shaped such that as a function of radial distance from said axis the angular spacing between said edges is a monotonic function of the radial distance;
   (d) means for determining a reference position of the body that allows transmission of the laser beam through said aperture;
   (e) drive means coupled to said body for reciprocating said body about said axis with respect to said reference position such that the body is turned in a first direction to cause said first edge to intersect the beam and in a second, opposite direction to cause said second edge to intersect the beam; and
   (f) means for determining the respective angular positions of said body at said first and second intersections such that the spatial position of the laser beam relative to the target apparatus is determinable from a knowledge of the reference position and of the respective angular positions at said first and second intersections;
   (g) the system further comprising means for detecting the intersection of any one of said edges with said laser beam.

9. A system as claimed in claim 8 in which a plurality of target apparatuses are mounted on different portions of the structure to be monitored, the system further comprising means for controlling the respective drive means of the target apparatuses to sequentially activate said drive means such that the beam path passes uninterrupted through the aperture of each non-activated target apparatus.

10. A system as claimed in claim 8 in which said detector means comprises a laser receiver remote from said laser source for receiving the laser beam transmitted along said path, the or each target apparatus being located along said path between said laser source and laser receiver.

11. A system as claimed in claim 8 in which said detector means comprises means at each of said first and second edges of the or each target apparatus for detecting the intersection of the laser beam therewith.

12. A system as claimed in claim 11 comprising a laser receiver remote from said laser source for receiving the laser beam transmitted along said path, the or each target apparatus being located along said path between said laser source and laser receiver such that the receiver is operable to monitor interruptions in the beam other than those due to an intersection thereof by one of said edges.

13. A target apparatus for detecting the position of a laser beam, comprising:
   (a) a body having first and second parts mounted for independent rotation about an axis, said first part having a first edge lying in a plane normal to the axis of rotation, said second part having a second edge lying in a plane normal to the axis of rotation, said parts being movable from respective reference positions in which said first and second edges extend in angularly spaced-apart relationship with respect to said axis to define therebetween an aperture allowing transmission of a laser beam therethrough, said first and second edges being shaped such that in said reference positions the angular spacing between said edges is a monotonic function of the radial distance, (b) drive means coupled to said first and second parts for moving each part from its reference position to a position in which a respective edge thereof intercepts the beam, and (c) means for determining the respective angular positions of said first and second parts at the intersections of said first and second edges, respectively, with the beam such that the spatial position of the laser beam relative to the target apparatus is determinable from said respective angular positions of said parts at said first and second intersections with respect to said reference positions.

14. Target apparatus as claimed in claim 13 in which said first and second edges are in axially spaced planes such that said parts are movable into overlapping relationship.

15. A target apparatus as claimed in claim 13 in which the drive means comprises first and second stepper motors for said first and second parts, respectively, and in which said reference positions are constituted by respective predetermined step positions of said first and second stepper motors and said angular positions at said first and second intersections are determined in terms of the respective corresponding step positions of said first and second stepper motors.

16. A target apparatus as claimed in claim 13 in which each of said first and second edges comprises an arc of a circle extending between an outer and an inner radial limit, each arc being concave as seen from the other.

17. A target apparatus as claimed in claim 16 in which a tangent to each arcuate edge at a point on the edge lying at a radial distance midway between said inner and outer radial limits is substantially 45° to a radial line extending through said point.

18. A target apparatus as claimed in claim 13 in which at first and second points on said first and second edges, respectively, lying at a same radial distance from said axis, respective tangents thereto at the respective points of intersection with the beam define an angle of intersection of 90°.

19. A target apparatus as claimed in claim 18 in which the respective tangents to the first and second edges at said first and second points are each at 45° to a radial line through the respective point.

20. A target apparatus as claimed in claim 13 in which said first and second edges comprise respective means at the edge for detecting the intersection of a laser beam therewith.

21. A target apparatus as claimed in claim 14 in which said first and second edges border first and second slots formed in said first and second parts respectively, said slots intersecting one another at a position dependent on the angular positions of said first and second parts to define said beam transmissive aperture at the intersection of said slots such that the position of a laser beam relative to the target apparatus may be tracked.

22. A system for monitoring movements of a natural or man-made structure, comprising:

(a) a laser source for directing a laser beam along a path adjacent the structure to be monitored; and (b) at least one target apparatus mounted to a portion of the structure for movement therewith relative to the beam path, said target apparatus comprising:

(c) a body having first and second parts mounted for independent rotation about an axis, said first part having a first edge lying in a plane normal to the axis of rotation, said second part having an edge lying in a plane normal to the axis of rotation, said parts being movable from respective reference positions in which said first and second edges extend in angularly spaced-apart relationship with respect to said axis to define therebetween an aperture allowing transmission of a laser beam therethrough, said first and second edges being shaped such that in said reference positions the angular spacing between said edges is a monotonic function of the radial distance, (d) drive means coupled to said first and second parts for moving each part from its reference position to a position in which its respective edge intercepts the beam; and (e) means for determining the respective angular positions of said first and second parts at the intersections of said first and second edges respectively with the beam such that the spatial position of the laser beam relative to the target apparatus is determinable from said respective angular positions of said parts at said first and second intersections with respect to said reference positions, (f) the system further comprising means for detecting the intersection of any one of said edges with said laser beam.

23. A system as defined in claim 22 in which a plurality of target apparatuses are mounted on different portions of the structure to be monitored, the system further comprising means for controlling the respective drive means of the target apparatuses to sequentially activate said drive means such that the beam path passes uninterrupted through the aperture of each non-activated target apparatuses.

24. A system as claimed in claim 23 in which said control means is operable to maintained the first and second edges of each non-activated target apparatus slightly spaced from their beam interception positions when the target apparatus was last activated such that the first and second edges of each target apparatus track the laser beam.

25. A system as claimed in claim 22 in which said detector means comprises a laser receiver remote from said laser source for receiving the laser beam transmitted along said path, the or each target apparatus being located along said path between said laser source and laser receiver.

26. A system as claimed in claim 22 in which said detector means comprises means at each of said first and second edges of the or each target apparatus for detecting the intersection of the laser beam therewith.

27. A system as claimed in claim 26 comprising a laser receiver remote from said laser source for receiving the laser beam transmitted along said path, the or each target apparatus being located along said path between said laser source and laser receiver such that the receiver is operable to monitor interruptions in the beam other than those due to an intersection thereof by one of said edges.

28. A target apparatus for detecting the position of a laser beam, comprising:

(a) a body mounted for linear movement, said body having first and second edges lying in a plane in which the body is movable, said first and second edges extending at an angle to the direction of movement and defining therebetween an aperture allowing transmission of a laser beam therethrough, said edges being shaped such that as a function of distance in a direction perpendicular to the direction of movement the spacing between the edges is a monotonic function of the perpendicular distance, (b) means for determining a reference position of said body, (c) drive means coupled to said body for reciprocating said body in said direction of movement so as to cause said first and second edges to provide first and second intersections respectively with a beam transmitted through said aperture, and (d) means for determining the respective linear positions of said body at said first and second beam intersections such that the spatial position of the laser beam relative to the target apparatus may be determined from a knowledge of said beam intersection positions and said reference position.

29. A target apparatus as claimed in claim 28 in which the drive means comprises a stepper motor and in which said reference position is constituted by a predetermined step position of said stepper motor and said linear positions at said first and second intersections are determined in terms of the corresponding step positions of said stepper motor.

30. A target apparatus as claimed in claim 28 in which each of said edges comprises a straight line.

31. A target apparatus as claimed in claim 30 in which said straight line edges are at 90° to one another.

32. A target apparatus as claimed in claim 31 in which said edges are each at 45° to the direction of movement.

33. A target apparatus as claimed in claim 28 in which said first and second edges comprise respective means at the edge for detecting the intersection of a laser beam therewith.

* * * * *